United States Patent Office 3,113,070
Patented Dec. 3, 1963

3,113,070
METHOD OF COMBATING FUNGI WITH THIOBENZAMIDE
Christoffel Willem Pluijgers, Utrecht, Netherlands, assignor to North American Philips Company, Inc., New York, N.Y., a corporation of Delaware
No Drawing. Filed Jan. 4, 1962, Ser. No. 164,419
Claims priority, application Netherlands Jan. 5, 1961
2 Claims. (Cl. 167—30)

The applicant has established that thioamides of fatty acids are fungicide but insufficient for practical use for combating moulds on living plants, also an unduly great phytotoxic activity is prohibitive for practical use.

The applicant has found now that thiobenzamide surprisingly couples a good fungicide activity to a small phytotoxic activity so that it may be suitable for the practical protection of plants against attack by moulds, and in particular powdery mildew.

The present invention relates to a composition for combating moulds on living plants or seeds in which an active substance is mixed with a solid or a liquid carrier, if desired with the addition of a surface-active substance or a dispersing agent, and it is characterized in that the active substance employed is thiobenzamide.

The activity of thiobenzamide was determined for several kinds of moulds, inter alia *Botrytis allii* Munn, *Penicillium italicum* Wehmer, *Cladosporium cucumerinum*, *Aspergillus niger*, *Rhizopus nigricans*, *Venturia inaequalis* and *Phytophthora infestans*.

According to the invention, the compositions for combating moulds on living plants may be manufactured by methods known for such compositions or similar methods.

A dust may be manufactured, for example, by grinding two parts by weight of thiobenzamide, 12 parts by weight of chalk and 80 parts by weight of dolomite until an average particle size of about 10 microns is reached.

A wettable powder may be manufactured, for example, by mixing 20 parts by weight of thiobenzamide, 75 parts by weight of attapulgite, 2 parts by weight of oleylamidomethyltaurate and 3 parts by weight of sodium lignine sulphonate and grinding the mixture until an average particle size of about 10 microns is obtained.

A miscible oil may be manufactured, for example, by mixing 10 parts by weight of thiobenzamide, 50 parts by weight of acetone, 15 parts by weight of methylethyl ketone, 20 parts by weight of xylene and 5 parts by weight of polyoxyethylene sorbitan fatty acid ester. An emulsion is obtained by mixing a miscible oil with water.

It is also possible to use other inert carriers for manufacturing the said powders, for example dolomite, kaoline or pipeclay; for miscible oils other inert diluents may be used, for example benzene, toluene or cyclohexanone. Surface-active substances other than those mentioned can also be used.

What is claimed is:
1. A method of inhibiting fungal attack of plants comprising applying to said plants a fungicidally effective amount of thiobenzamide.
2. A method of inhibiting fungal attack of seeds comprising applying to said seeds a fungicidally effective amount of thiobenzamide.

References Cited in the file of this patent
UNITED STATES PATENTS 2,166,120 Bousquet _____ July 18, 1939
2,230,691 Lewis _____ Feb. 4, 1941

FOREIGN PATENTS 488,429 Great Britain _____ July 6, 1938

OTHER REFERENCES

Chem. Abs., volume 16, 1912, page 1588[9]; volume 52, 1958, page 10147(h); volume 54, 1960, page 7959(f).